US008502494B2

(12) United States Patent
Nieh et al.

(10) Patent No.: US 8,502,494 B2
(45) Date of Patent: Aug. 6, 2013

(54) BATTERY CHARGING APPARATUS AND METHOD

(75) Inventors: Kai-Wei Nieh, Monrovia, CA (US); Tung-Hsiu Shih, Ceritos, CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 430 days.

(21) Appl. No.: 12/870,755

(22) Filed: Aug. 27, 2010

(65) Prior Publication Data

US 2011/0050159 A1 Mar. 3, 2011

Related U.S. Application Data

(60) Provisional application No. 61/275,361, filed on Aug. 28, 2009.

(51) Int. Cl.
*H02J 7/00* (2006.01)
*H01M 10/44* (2006.01)
*H01M 10/46* (2006.01)

(52) U.S. Cl.
USPC ............ 320/101; 320/128; 320/130; 320/137

(58) Field of Classification Search
USPC ........................................................ 320/101
See application file for complete search history.

(56) References Cited

U.S. PATENT DOCUMENTS

| | | | |
|---|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,119,769 A | 10/1978 | Schneider et al. |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,602,481 A * | 2/1997 | Fukuyama ................... 324/434 |
| 5,607,789 A | 3/1997 | Treger et al. |
| 5,612,152 A | 3/1997 | Bates et al. |
| 5,656,364 A | 8/1997 | Rickerby et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,725,909 A | 3/1998 | Shaw et al. |
| 5,786,582 A | 7/1998 | Roustaei et al. |
| 5,824,374 A | 10/1998 | Bradley, Jr. et al. |
| 5,847,566 A * | 12/1998 | Marritt et al. ................ 324/427 |
| 5,871,865 A | 2/1999 | Barker et al. |
| 5,894,656 A | 4/1999 | Menon et al. |
| 5,961,672 A | 10/1999 | Skotheim et al. |

(Continued)

FOREIGN PATENT DOCUMENTS

| | | |
|---|---|---|
| CN | 1661354 A | 8/2005 |
| EP | 0 829 913 A | 3/1998 |

(Continued)

OTHER PUBLICATIONS

Antaya et al. "Preparation and Characterization of LiCoO2 Thin Films by Laser Ablation Deposition", J. Electrochem. Soc., vol. 140, No. 3, Mar. 1993, pp. 575-578.

(Continued)

*Primary Examiner* — Arun Williams (74) *Attorney, Agent, or Firm* — Ashok K. Janah; Janah & Associates, P.C.

(57) ABSTRACT

A method and apparatus for charging a rechargeable battery comprises determining a safe charging voltage $V_{safe}$ that is the maximum open circuit voltage of the battery which provides a minimum battery capacity for a predetermined number of charge and discharge cycles of the battery. The battery is charged with a voltage $V_{hv}$ which is higher than the $V_{safe}$. The charging voltage is removed and open circuit voltage of the battery is measured. The charging and measuring steps are repeated when the open circuit voltage is less than $V_{safe}$, and the charging process is terminated when the open circuit voltage is substantially equal to $V_{safe}$.

48 Claims, 3 Drawing Sheets

U.S. PATENT DOCUMENTS

| | | | |
|---|---|---|---|
| 5,985,485 A | 11/1999 | Ovshinsky et al. | |
| 6,017,654 A | 1/2000 | Kumta et al. | |
| 6,022,640 A | 2/2000 | Takada et al. | |
| 6,039,850 A | 3/2000 | Schulz | |
| 6,051,114 A | 4/2000 | Yao et al. | |
| 6,118,248 A | 9/2000 | Gartstein et al. | |
| 6,118,250 A * | 9/2000 | Hutchison et al. | 320/110 |
| 6,146,715 A | 11/2000 | Kim et al. | |
| 6,148,503 A | 11/2000 | Delnick et al. | |
| 6,168,884 B1 | 1/2001 | Neudecker et al. | |
| 6,197,450 B1 | 3/2001 | Nathan et al. | |
| 6,217,623 B1 | 4/2001 | Reichert et al. | |
| 6,218,049 B1 | 4/2001 | Bates et al. | |
| 6,238,847 B1 | 5/2001 | Axtell, III et al. | |
| 6,242,129 B1 | 6/2001 | Johnson | |
| 6,264,709 B1 | 7/2001 | Yoon et al. | |
| 6,280,875 B1 | 8/2001 | Kwak et al. | |
| 6,287,711 B1 | 9/2001 | Nieh et al. | |
| 6,340,880 B1 * | 1/2002 | Higashijima et al. | 320/162 |
| 6,365,010 B1 | 4/2002 | Hollars | |
| 6,379,835 B1 | 4/2002 | Kucherovsky et al. | |
| 6,387,039 B1 | 5/2002 | Moses | |
| 6,387,563 B1 | 5/2002 | Bates | |
| 6,398,824 B1 | 6/2002 | Johnson | |
| 6,402,796 B1 | 6/2002 | Johnson | |
| 6,411,780 B1 | 6/2002 | Maruyama | |
| 6,413,645 B1 | 7/2002 | Graff et al. | |
| 6,517,968 B2 | 2/2003 | Johnson | |
| 6,558,836 B1 | 5/2003 | Whitacare et al. | |
| 6,632,563 B1 | 10/2003 | Krasnov et al. | |
| 6,636,017 B2 | 10/2003 | Zink et al. | |
| 6,645,658 B2 | 11/2003 | Morozumi | |
| 6,658,124 B1 | 12/2003 | Meadows | |
| 6,661,197 B2 | 12/2003 | Zink et al. | |
| 6,713,987 B2 | 3/2004 | Krasnov et al. | |
| 6,863,699 B1 | 3/2005 | Krasnov et al. | |
| 6,866,901 B2 | 3/2005 | Burrows et al. | |
| 6,921,464 B2 | 7/2005 | Krasnov et al. | |
| 6,940,988 B1 | 9/2005 | Shennib et al. | |
| 7,037,621 B2 | 5/2006 | Kikuchi et al. | |
| 7,056,620 B2 | 6/2006 | Krasnov et al. | |
| 7,186,479 B2 | 3/2007 | Krasnov et al. | |
| 7,286,479 B2 | 10/2007 | Bragg | |
| 2001/0041294 A1 | 11/2001 | Chu et al. | |
| 2002/0004167 A1 | 1/2002 | Jenson et al. | |
| 2002/0028384 A1 | 3/2002 | Krasnov et al. | |
| 2002/0071989 A1 | 6/2002 | Verma et al. | |
| 2002/0110733 A1 | 8/2002 | Johnson | |
| 2002/0150823 A1 | 10/2002 | Breitkopf et al. | |
| 2003/0121142 A1 | 7/2003 | Kikuchi et al. | |
| 2003/0152829 A1 | 8/2003 | Zhang et al. | |
| 2003/0160589 A1 | 8/2003 | Krasnov et al. | |
| 2004/0018424 A1 | 1/2004 | Zhang et al. | |
| 2004/0064937 A1 | 4/2004 | Krasnov et al. | |
| 2004/0086762 A1 | 5/2004 | Maeda et al. | |
| 2004/0175609 A1 | 9/2004 | Yageta et al. | |
| 2005/0079418 A1 | 4/2005 | Kelley et al. | |
| 2005/0130032 A1 | 6/2005 | Krasnov et al. | |
| 2005/0156573 A1 | 7/2005 | Lin | |
| 2006/0040169 A1 | 2/2006 | Liu et al. | |
| 2006/0040170 A1 | 2/2006 | Liu et al. | |
| 2006/0068258 A1 | 3/2006 | Kinoshita | |
| 2006/0115706 A1 | 6/2006 | Maeda et al. | |
| 2006/0134522 A1 | 6/2006 | Zhang et al. | |
| 2006/0216589 A1 | 9/2006 | Krasnov et al. | |
| 2007/0037054 A1 | 2/2007 | Kikuchi et al. | |
| 2007/0047750 A1 | 3/2007 | Sauer et al. | |
| 2007/0104343 A1 | 5/2007 | Bengtsson et al. | |
| 2007/0104344 A1 | 5/2007 | Goldberg | |
| 2007/0141460 A1 | 6/2007 | You et al. | |
| 2007/0166612 A1 | 7/2007 | Krasnov et al. | |
| 2007/0194754 A1 * | 8/2007 | Fukuzawa et al. | 320/112 |
| 2008/0213664 A1 | 9/2008 | Krasnov et al. | |
| 2008/0217162 A1 | 9/2008 | Delrue et al. | |
| 2008/0263855 A1 | 10/2008 | Li et al. | |
| 2009/0010462 A1 | 1/2009 | Ekchian et al. | |
| 2009/0051321 A1 * | 2/2009 | Sato | 320/132 |
| 2009/0057136 A1 | 3/2009 | Wang et al. | |
| 2009/0136839 A1 | 5/2009 | Krasnov et al. | |

FOREIGN PATENT DOCUMENTS

| | | |
|---|---|---|
| EP | 1 458 037 A | 9/2004 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61195563 A | 8/1986 |
| JP | 04-295015 | 10/1992 |
| JP | 09-259929 A | 10/1997 |
| JP | 2001-044073 A | 2/2001 |
| JP | 2003-249199 A | 9/2003 |
| WO | WO-95/14311 A | 5/1995 |
| WO | WO-99/23714 | 5/1999 |
| WO | WO-00/60689 A | 10/2000 |
| WO | WO-01/73873 A | 10/2001 |
| WO | WO-02/021627 A3 | 1/2003 |
| WO | WO-02/042516 A3 | 1/2003 |
| WO | WO-03/061049 A | 7/2003 |
| WO | WO-03/073531 A3 | 12/2003 |
| WO | WO-03/005477 A3 | 12/2004 |
| WO | WO-2006/105188 A1 | 10/2006 |
| WO | WO-2006/105050 A3 | 3/2007 |
| WO | WO-2007/042394 | 4/2007 |
| WO | WO-2008/108999 A3 | 11/2008 |
| WO | WO-2008/134053 A1 | 11/2008 |
| WO | WO-2009/073150 | 6/2009 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Jenson, Mark, U.S. Provisional Patent Application (unpublished) U.S. Appl. No. 60/191,774, "Comprehensive patent for the fabrication of a high volume, low cost energy products such as solid state lithium ion rechargeable battery, supercapacitors and fuel cells", filed Mar. 24, 2000.

Jenson et al., U.S. Provisional Patent Application (unpublished) U.S. Appl. No. 60/225,134, "Apparatus and method for rechargeable batteries and for making and using batteries", filed Aug. 14, 2000.

Jenson et al., U.S. Provisional Patent Application (unpublished) U.S. Appl. No. 60/238,673, "Battery Having Ultrathin Electrolyte", filed Oct. 6, 2000.

Yang et al., "Effect of annealing temperature on structure and electrochemical properties of LiCoO2 cathode thin films", Rare Metals, vol. 25, Dec. 2006, pp. 189-192.

PCT International Search Report in Application No. PCT/US2008/013213 (WO 2009/073150 A1), mailed Jun. 18, 2009.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

* cited by examiner

BATTERY CHARGING APPARATUS AND METHOD

CROSS-REFERENCE

The present application claims priority to U.S. Provisional Patent Application Ser. No. 61/275,361 filed on Aug. 28, 2009 by Nieh et al., which is incorporated by reference herein and in its entirety.

BACKGROUND

Embodiments of the present invention relate to charging and recharging a battery.

Batteries are used to store electrical charge, and can include many different compositions of an electrolyte between electrodes, such as an anode, cathode, and/or current collectors, which cooperate to store electrical charge and generate a voltage. Conventional large scale batteries are used to store energy to power automobiles, store solar or wind generated energy, or as power grid back up systems. Thin film batteries are used in applications that require a small battery with a high energy density such as, for example, portable electronics, medical devices and space systems. The battery component films of thin film batteries are thinner than conventional batteries, for example, the films can have thicknesses of less than 100 microns, providing batteries having thicknesses that are 100 times smaller than the thickness of conventional batteries. Thin film batteries can either be used individually, or multiple thin film batteries can be stacked together to provide more power or more energy.

Lithium batteries use lithium, such as lithium ion and (Li-ion) and lithium polymer (Li-polymer) batteries, and can have applications for conventional large scale batteries, as well as thin film batteries. It is desirable to minimize the time taken to recharge a conventional or thin film battery for almost any application, including mobile, electronic, or even automobile rechargeable batteries. However, a typical recharging process for lithium and other such batteries includes a first stage which uses a constant current charge level with a voltage limit set at a predefined value, for example, 4.2 volts. This stage takes about one hour, and the battery can be recharged to about 70% of the initial capacity. After the constant current recharge stage, in a second recharging stage, a constant voltage recharge step set to a voltage of 4.2 volts is used to charge the battery to full capacity in about two hours. Attempts have been made to charge lithium and other batteries at higher voltages than 4.2 volts to increase the rate of charging, but these methods have led to many negative effects, such as permanent damage to the cathode electrode material, plating of lithium metal on the anode electrode, or even reaction of liquid electrolyte with anode or cathode which can lead to fires or even small explosions. Thus, existing battery chargers for lithium and other batteries limit the maximum charging voltage to a predefined value, such as 4.2 volts, which increases charging time.

For reasons including these and other deficiencies, and despite the development of various recharging methods and apparatus for batteries, further improvements in recharging apparatus and methods are continuously being sought.

SUMMARY

A method of charging a rechargeable battery comprising an electrolyte between an anode and cathode, comprises determining a safe charging voltage $V_{safe}$ that is the maximum open circuit voltage of the battery which provides a minimum battery capacity for a predetermined number of charge and discharge cycles of the battery. The battery is charged with a voltage $V_{hv}$ which is higher than the $V_{safe}$. The charging voltage is removed, and the open circuit voltage of the battery is measured. The charging and measuring steps are repeated when the open circuit voltage is less than $V_{safe}$, and the charging process is terminated when the open circuit voltage is substantially equal to $V_{safe}$.

In another embodiment, a charging method comprises:
(a) determining a safe charging voltage $V_{safe}$ that is the maximum open circuit voltage of the battery which provides a minimum battery capacity for a predetermined number of charge and discharge cycles of the battery;
(b) charging the battery with a voltage $V_{hv}$ which is higher than the $V_{safe}$;
(c) removing the charging voltage and measuring the open circuit voltage of the battery; and
(d) performing one of the following:
  (i) when the open circuit voltage is less than $V_{safe}$, repeating steps (b) through (d);
  (ii) when the open circuit voltage is substantially equal to $V_{safe}$, reducing the charging voltage by from about 0.1 to 0.3 volts, and then repeating steps (b) through (d); or
  (iii) ending the charging process when the charging voltage equals $V_{safe}$.

In still another embodiment, the charging method comprises:
(a) determining a safe charging voltage $V_{safe}$ that is the maximum open circuit voltage of the battery which provides a minimum battery capacity for a predetermined number of charge and discharge cycles of the battery;
(b) determining an internal resistance $R_{in}$ of the battery;
(c) charging the battery with a voltage $V_{hv}$ which is higher than $V_{safe}$;
(d) monitoring the charging current $I_{crg}$ of the battery; and
(e) performing one of:
  (i) when $V_{hv} - I_{crg} \times R_{in} = V_{safe}$, reducing the charging voltage by about 0.1 to about 0.3 volts, and repeating (c) through (e); or
  (ii) when the charging voltage is equal to or less than $V_{safe}$, ending the charging process.

A battery charging apparatus for charging a battery an electrolyte between an anode and cathode, the apparatus comprising a voltage charger that provides a direct current voltage suitable for charging a battery; a voltmeter to measure the open circuit voltage of the battery and generate an open circuit voltage signal; an ammeter to measure a current of the circuit and generate a current signal; and a controller to regulate the voltage charger in response to a voltage signal from the voltmeter, a current signal from the ammeter, and a determination of the internal resistance of the battery, the controller comprising computer-readable code to:
(1) determine a safe charging voltage $V_{safe}$ that is the maximum open circuit voltage of the battery which provides a minimum battery capacity for a predetermined number of charge and discharge cycles of the battery;
(2) operate the voltage charger to charge the battery with a voltage $V_{hv}$ which is higher than the $V_{safe}$;
(3) disconnect the voltage charger and use the voltmeter to measure the open circuit voltage of the battery; and
(4) repeat (2) and (3) when the open circuit voltage is less than $V_{safe}$, and terminate the charging process when the open circuit voltage is substantially equal to $V_{safe}$.

Another battery charging apparatus includes a controller comprising computer-readable code to:
(1) determine a safe charging voltage $V_{safe}$ that is the maximum open circuit voltage of the battery which provides a minimum battery capacity for a predetermined number of charge and discharge cycles of the battery;

(2) operate the voltage charger to charge the battery with a voltage $V_{hv}$ which is higher than the $V_{safe}$;

(3) remove the charging voltage and measure the open circuit voltage of the battery; and (4) perform one of the following:
  (i) when the open circuit voltage is less than $V_{safe}$, repeat steps (2) through (4);
  (ii) when the open circuit voltage is substantially equal to $V_{safe}$, reducing the charging voltage by from about 0.1 to 0.3 volts, and then, repeating (2) through (4); or
  (iii) ending the charging process when the charging voltage equals $V_{safe}$.

Still another battery charging apparatus includes a controller comprising computer-readable code to:

(1) determine a safe charging voltage $V_{safe}$ that is the maximum open circuit voltage of the battery which provides a minimum battery capacity for a predetermined number of charge and discharge cycles of the battery;

(2) determine an internal resistance $R_{in}$ of the battery;

(3) operate the voltage charger to charge the battery with a voltage $V_{hv}$ which is higher than $V_{safe}$;

(4) monitor the charging current $I_{crg}$ of the battery; and (5) performing one of:
  (i) when $V_{hv} - I_{crg} \times R_{in} = V_{safe}$, reducing the charging voltage by about 0.1 to about 0.3 volts, and repeating (3) through (5); or
  (ii) when the charging voltage is equal to or less than $V_{safe}$, ending the charging process.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION

Figure 1:
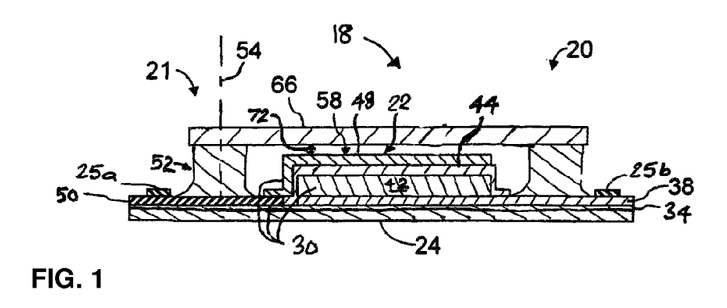
FIG. 1 is a sectional side view of an exemplary embodiment of a battery cell on a support and showing a sealant and cap around the battery cell.
Figure 2:
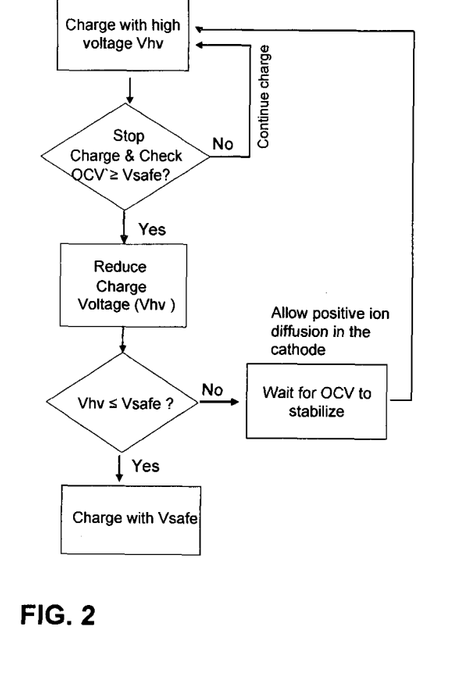
FIG. 2 is a flowchart illustrating an embodiment of a battery recharging process comprising a high voltage fast charge with a voltage cutoff.
Figure 3:
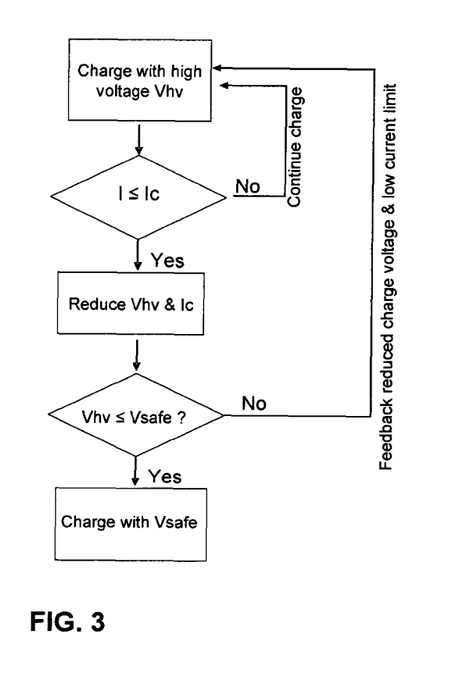
FIG. 3 is a flowchart illustrating an embodiment of a battery recharging process comprising a high voltage fast charge with a current cutoff.

An exemplary embodiment of a battery 18, which can be a conventional battery (not shown) or a thin film battery 20, comprises a battery cell 22 on a support 24, as shown in FIG. 1. The battery cell 22 can be made on a support 24 that comprises a material that is impermeable, or has very low permeability, to environmental elements such as oxygen, water vapor, carbon monoxide and carbon dioxide. The support 24 should also have a relatively smooth surface and sufficient strength to support battery component films 30 at their fabrication and operational temperatures. For example, the support 24 can comprise aluminum, aluminum oxide, metal foil, metalized plastic film, mica, quartz, or steel. The battery cell 22 is also at least partially surrounded by a protective casing 21 that protects the battery cell 22 against harmful elements from the surrounding environment. While an exemplary version of a battery is shown to illustrate aspects of the present invention, it should be understood that other types of battery structures and compositions can be charged or recharged by the battery charging method and apparatus described herein; and that the present invention should not be limited to the exemplary battery shown herein.

Each battery cell 22 comprises a plurality of battery component films 30 on the support 24 and terminals 25a,b connected to the battery component films 30 to allow the cell to charge, store and generate electrical energy. In one exemplary embodiment, the battery component films 30 can include, for example, an adhesion layer 34, cathode current collector 38, cathode 42, electrolyte 44, anode 48, and anode current collector 50. An adhesion layer 34 improves adhesion of overlying battery component films 30. The adhesion layer 34 can comprise a metal or metal compound, such as, for example, aluminum, cobalt, titanium, other metals, or alloys or compounds thereof; or a ceramic oxide such as, for example, lithium cobalt oxide.

A cathode current collector 38 is formed on the adhesion layer 34 to collect the electrons during charge and discharge process. The cathode current collector 38 is typically a conductor and can be composed of a metal, such as aluminum, platinum, silver or gold. The current collector 38 may also comprise the same metal as the adhesion layer 34 provided in a thickness that is sufficiently high to provide the desired electrical conductivity. A suitable thickness for the current collector 38 is from about 0.05 microns to about 2 microns. In one version, the current collector 38 comprises platinum in a thickness of about 0.2 microns.

A cathode 42 comprising an electrochemically active material is formed over the current collector 38. In one version, the cathode 42 is composed of lithium metal oxide, such as, for example, lithium cobalt oxide LiCoO2, lithium nickel oxide, lithium manganese oxide LiMnO4, lithium iron oxide, or even lithium oxides comprising mixtures of transition metals such as, for example, lithium cobalt nickel oxide. Other types of cathodes 42 that may be used comprise amorphous vanadium oxide, such as vanadium pentoxide, crystalline $V_2O_5$ or $TiS_2$. The cathode 42 can be deposited as a single film or as a stack of films, with alternate deposition and annealing steps. Typically, the cathode stack has a thickness of at least about 5 microns, or even at least about 10 microns.

An electrolyte 44 is formed over the cathode 42. The electrolyte 44 can be, for example, an amorphous lithium phosphorus oxynitride film, also known as a LiPON film. Advantageously, unlike the liquid electrolyte used in Li-ion or Li-polymer batteries, LiPON is a thin film of ceramic material that is solid. The absence of liquid in such solid-state lithium batteries reduces the possibility of explosion or battery deterioration due to reaction of cathode or anode with the liquid electrolyte. In one embodiment, the LiPON has the stoichiometric form $Li_xPO_yN_z$ in an x:y:z ratio of about 2.9:3.3:0.46. In one version, the electrolyte 44 has a thickness of from about 0.1 microns to about 5 microns. This thickness is suitably large to provide sufficiently high ionic conductivity and suitably small to reduce ionic pathways to minimize electrical resistance and reduce stress.

An anode 48 is formed on the electrolyte 44, and the anode 48 can be the same material as the cathode 42, as already described. A suitable thickness is from about 0.1 microns to about 20 microns. In one version, the anode 48 is made from lithium which is also sufficiently conductive to serve as the anode current collector 50, and in this version, the anode 48 and anode current collector 50 are made of the same material. In still another version, the anode current collector 50 is deposited onto the electrolyte 44, and the anode 48 is deposited such that it extends over the electrolyte 44 and onto a portion of the anode current collector 50. In this version, the anode current collector 50 is the same material as the cathode current collector 38 to provide a conducting surface from which electrons may be dissipated or collected from the anode 48. For example, in one version, the anode current collector 50 comprises a non-reactive metal such as silver, gold, or platinum in a thickness of from about 0.05 microns to about 5 microns. Still other common anode 48 materials include lithium, silicon antimony oxynitride (SiSbON), and aluminum lithium compounds such as AlLi. In the version shown, an anode current collector 50 is selectively deposited onto a region of the electrolyte 44. The anode 48 is then deposited onto the electrolyte 44 and part of the anode current collector 50.

After formation of the battery cell 22, a sealant 52 is applied to extend across at least one of, a plurality of, or even all of the side perimeter surfaces 54 which extend around the battery cell 22 to form a portion of the protective casing 21 of the battery 20. The sealant 52 can be a polymeric material, such as epoxy, thermoplastic polymer, thermoset polymer, polymerized ethylene acid copolymer, hydrocarbon grease, paraffin or wax. A suitable sealant 52 comprises Epo-Tek™ 301, commercially available from Epoxy Technology, Billerica, Mass.; or a thermoplastic or thermoset film such as Surlyn®, available from E. I. du Pont de Nemours and Company of Willmington, Del. In one version, the sealant 52 comprises a thickness of less than 60 microns, for example, from about 20 to about 50 microns. The protective casing 21 can also have a cover 66 that is placed on top of the battery cell 22 and is made from the same material as the support 24 or from different materials, including quartz, metal foil, ceramic, and metalized plastic film. The cover 66 can have a thickness of less than 50 microns, for example, from about 7 to about 40 microns. The cover 66 is shaped and sized so that the cathode current collector 38 and the anode current collector 50 extend out of the covered area to be exposed as terminals 25a,b. The top surface 58 of the anode 48 or battery cell 22 can be separated from the cover 66 to define a gap 72 therebetween.

Common cathode used as the cathode 42 in rechargeable lithium batteries or rechargeable Li-ion batteries include $LiCoO_2$, $LiMn_2O_4$, and $LiFePO_4$. These cathode materials often have layered structures, with lithium ions located between the layers. When charging such a battery 20, the Li-ions are extracted from the layers of the cathode 42 and into the electrolyte 44 and then receive electrons and become metallic Li at the anode 48. Conversely, during the discharge process lithium metal from the anode 48 convert to lithium ions and travel through the electrolyte 44 to the cathode 42. The charging voltage that can be applied to a particular battery 20 depends on the types of materials used for the cathode 42, electrolyte 44, and anode 48. For example, in the case of batteries 20 comprising lithium, the composition and stoichiometry of the lithium compound used to make the cathode 42 can control the maximum charging current can be applied to the cathode 42. This is because the stoichiometry of the lithium compound that makes up the cathode 42 can only change within a specific range of stoichiometric compositions. Beyond the acceptable range of stoichiometry, the lithium compound that makes up the cathode 42 can be transformed to a different phase which would subsequently impede charging and discharging processes.

Applying higher charging voltage will extract more Li-ions from the cathode 42 and provide higher battery storage capacity. However, the cathode structure can become unstable if it looses excessive amounts of Li-ions, whereupon the cathode material undergoes a phase change and becomes a non-rechargeable phase. For example, for thin film batteries 20 having cathodes 42 composed of $Li_1Co_1O_2$, the stoichiometry of the $Li_1Co_1O_2$ compound can vary to provide lithium value of from about 0.5 to about 1, that is, between $Li_{0.5}Co_1O_2$ to $Li_1Co_1O_2$. If the lithium value falls to less than 0.5, the material becomes unstable and can go through a phase change and become a non-rechargeable phase. Accordingly, it is desirable to keep the cathode 42 within the acceptable range of stoichiometric values. This will reduce the storage capacity of the rechargeable battery 20. To avoid the capacity drop after charge/discharge cycles, rechargeable batteries 20 are often charged with an upper charging voltage limit. As one example, for $Li_1Co_1O_2$ compounds, the maximum voltage or $V_{safe}$, as defined below, that can be applied to the battery using conventional charging methods is 4.2 V. In other words, the upper charging voltage limit for the $LiCoO_2$/Cathode system is at about 4.2V for when used in consumer electronic devices and about 4.1V when used in implantable medical devices. Similarly, an upper charging voltage limit for $LiMn_2O_4$/Cathode system is about 4.2V; and an upper charging voltage limit for $LiFePO_4$/Cathode system is about 3.6V.

The present charging apparatus and processes are illustrated with reference to exemplary batteries having a cathode 42 of lithium cobalt oxide; however, the apparatus and processes described herein can be used for other types of batteries and for other applications as would be apparent to those of ordinary skill in the art. Accordingly, the scope of the present invention should not be limited to the illustrative examples provided herein.

In a thin film battery 20 comprising a battery cell 22 having a cathode 42 comprising $LiCoO_2$, for example, in a micro or nano-crystalline form, and an anode 48 comprising lithium, it has been determined that the charging rate can be limited by (1) the rate of transport of lithium ions across the electrolyte 44, and (2) the rate of diffusion of lithium ions through the full thickness of the cathode 42. For example, for a cathode 42 having a lithium ion diffusion rate of $2 \times 10^{-9}$ cm$^2$/sec, when there is no limit for the transport of lithium ions other than the lithium ion diffusion in the cathode 42, it takes less than 7 minutes to recharge a 10 micron thick cathode to 90% of the full capacity. This is equivalent to an average charging current of 5 mA/cm$^2$.

It was further determined that the rate of lithium ion propagation through the electrolyte 44 becomes the dominant limiting factor in the rate of charging a battery. For example, the typical internal resistance of a battery cell 22 having an area of 1 cm$^2$ is about 150 ohm, and it is believed that most of this internal resistance occurs as a result of the electrolyte 44. As one example, when nearly completely discharged, the open circuit voltage (OCV) of a battery 20 comprising a single battery cell 22 is about 3.6V. The initial charging current for this battery at a 4.2V charging voltage is: (4.2V−3.6V)/150 ohm=4 mA. The charging current will drop rapidly as the open circuit voltage of the battery 20 increases. At this charging current, the lithium ion flux is much lower than the possible rate of lithium ion diffusion through the cathode 42. To improve the lithium ion current through the electrolyte 44, the internal resistance can be lowered by reducing the thickness of the electrolyte 44 or by increasing the charging voltage. However, reducing the thickness of the electrolyte 44 increases the possibility of electronic leakage. Further, increasing the charging voltage can cause excess lithium ions to be taken out of the cathode 42 leading to transformation of the phase of material of the cathode 42 to a limited charging or even non-rechargeable phase.

Also, since the lithium ions that travel from the cathode 42 through the electrolyte 44 to the anode 48 originate in the cathode 42, a lithium ion deficient region tends to form in the cathode near the interface between the cathode 42 and the electrolyte 44. If the charging voltage is too high, the Li-ion current across the electrolyte can be higher than the Li-ion diffusion in the cathode can support. In this situation, the Li-ion concentration of the cathode 42 near the cathode/electrolyte interface can fall below the stable limit causing the cathode 42 to partially or completely transform into a non-rechargeable phase.

The following charging and recharging process of apparatus solve these problems by increasing the maximum charging voltage that can be applied to a battery 20 without causing a change in phase of the cathode material off the battery 20. In these systems, the following definitions are applicable:

$C_{safe}$ is the minimum (or safe) cathode positive ion concentration at which the cathode material substantially does not change in phase, for example, after 100 charging cycles less than 10% by volume of the cathode material will change in phase. Preferably, $C_{safe}$ is the minimum cathode positive ion concentration at which the cathode material does not change in phase by more than 10% within the desired battery service life, which depends on the application of the battery.

$V_{safe}$ is the maximum open circuit voltage of the battery which provides a minimum battery capacity for a predetermined number of charge and discharge cycles of the battery. At this open circuit voltage, even after a number of charge and discharge cycles, the battery will still provide the desired battery cycle life and battery capacity retention requirements. $V_{safe}$ can also be defined as the open circuit voltage of the battery when the concentration of the positive ion in the cathode equals the $C_{safe}$. This is theoretically the maximum safe voltage that can be applied to the battery without causing a change in phase of some or all of the cathode material.

It should be understood that $V_{safe}$ depends on both of the type of the cathode material and the cycle lifetime requirements of a particular battery. For example, for $Li_1Co_1O_2$, $V_{safe}$ that is from about 4.1 to about 4.2 volts, or even either 4.1 or 4.2 volts.

The value of $V_{safe}$ can also change with the application depending on the cycle lifetime requirements of the battery 20. As one example, a battery 20 that includes a cathode 42 comprising $LiCoO_2$, can be charged with a safe charging voltage Vsafe that is about 4.2 volts to provide a minimum battery 5-hour rate discharge capacity of at least about 70% of the initial capacity after at least about 1000 charge and 80%-depth discharge cycles of the battery. As one example, a lithium-ion battery used in a cell phone can be charged at a $V_{safe}$ of 4.2V to achieve a battery capacity of at least about 70% throughout a battery charge and discharge cycle lifetime for a cell phone of at least about 500 cycles, or even from about 1000 to about 1500 cycles.

In contrast, a lithium-ion battery used in implantable medical device has a much larger lifetime requirement, and consequently, $V_{safe}$ for such an implantable Li-ion battery is typically 4.1V to achieve a battery capacity of at least about 70% throughout a battery charge and discharge cycle lifetime for at least about 2000 cycles, or even from about 3000 to about 4000 cycles. Thus, in this situation, a battery 30 that includes a cathode comprising $LiCoO_2$, has a safe charging voltage Vsafe that is about 4.1 volts to provide a minimum battery 5-hour rate discharge capacity of at least about 70% of the initial capacity after at least about 3000 charge and 80%-depth discharge cycles of the battery. Because the implantable medical device requires a longer lifetime, such devices are charged at a lower $V_{safe}$ voltage to achieve a greater number of charging and discharging cycles.

It should be further noted that the value of $V_{safe}$ will change for batteries 20 made from other compounds or having different chemical compositions. For examples, suitable $V_{safe}$ values for batteries made with $LiMn_2O_4$/Cathode, which are typically used in consumer electronics, can be about 4.2V. In still another example, suitable $V_{safe}$ values for batteries made with $LiFePO_4$/Cathode, which are typically used in power tool applications, can be about 3.6V.

$V_{hv}$ is the charging voltage applied to the battery 20 in the fast charge apparatus and process. When the battery comprises an anode current collector and a cathode current collector, the battery 20 can be charged by connecting a positive polarity of a direct current (DC) power source to the cathode current collector of the battery and connecting a negative polarity of a DC power source to the anode current collector of a battery. The present charging system allows application of a charging voltage $V_{hv}$ which is higher than $V_{safe}$ to allow faster charging operations; however, not high enough to cause a phase change in the cathode material. For example, a battery 20 comprising a lithium cobalt oxide cathode can be charged a voltage $V_{hv}$ which is higher than the $V_{safe}$ by at least about 0.2 volts or even about 0.4 volts. In one version, the battery is charged with an initial charging voltage $V_{hv}$ of from about 4.4 to about 5 volts, or even 4.8 volts. The battery 20 can be charged with the voltage $V_{hv}$ for from about 5 to about 50 seconds.

$I_c$ is the cut off current for charging; $I_c=(V_{hv}-V_{safe})$/Battery internal resistance. Note that the internal resistance of the battery 20 can be predetermined by any standard battery internal resistance measurement method or calculated from the values of the measured battery voltage difference before and after the charging voltage ($V_{hv}$) is applied to the battery divided by the measured charging current.

OCV, open circuit voltage, of the battery 20 is the voltage generated by the battery when the charging voltage itself is removed.

One version of a charging process suitable for rapidly charging a battery 20, such as a lithium ion battery, is as follows:

Step 1: Select a desirable fast charge voltage that is a constant charging voltage $V_{hv}$. If the charging voltage is too low then the charging time is long; however, if the voltage is too high then the electrolyte 44 can be damaged. In one exemplary version, $V_{hv}$ is set to from about 4.4V to about 5V, such as for example 4.6V—this example being applicable if the electrolyte 44 can be damaged when the charging voltage is >5V.

Step 2: Charge the battery with the selected constant charging voltage $V_{hv}$.

Step 3: Stop the charging process more than once, or even frequently, to measure the battery OCV. When the battery has been charging, it is desirable to wait for a time period that is at least about 10% of the time period for charging the battery before measuring the open circuit voltage of the battery 20. This waiting period allows the average concentration of lithium ions though the electrolyte 44 to stabilize, particularly at the interface between the cathode 42 and electrolyte 44, a region which tends to become depleted in lithium ions. For example, it is better to wait for a time period that is at least about 10% of the time period for charging the battery 20 before measuring the open circuit voltage of the battery. As one example, the waiting time period after removing the charging voltage and before measuring the open circuit voltage of the battery, can be from about 1 to about 5 seconds. However waiting for too long a time period results in slow overall or total battery charging time, and consequently, reduces the battery charging efficiency.

When the measured OCV is greater than or equal to the $V_{safe}$, stop battery charging by disconnecting the charging source for a period of a few seconds to tens of seconds. As one example, $V_{safe}$ can be from about 4.1 V to about 4.4V, such as for example 4.2V, for a battery having a cathode composed of lithium cobalt oxide.

Step 4: Reduce the $V_{hv}$ by from about 0.1- to about 0.3V, such as for example 0.1V, for a battery having a cathode composed of lithium cobalt oxide.

Step 5: Repeat step 2, 3 & 4 until the $V_{hv}$ equals or less than Vsafe.

Step 6: Charge with $V_{safe}$ until the charging current drops to a preset value, typically 0.1 C-rate. It should be noted that step 6 provides the last 5% of the capacity; if this final capacity is not needed, then step 6 can be eliminated to minimize the charge time.

Another embodiment of a fast recharging process is as follows:

Step 1: Set a fast charge voltage $V_{hv}$, such as for example, from about 4.4V to about 5V, or even in one version, 4.6V. If the charging voltage is too low, then the charging time is long and if the voltage is too high for the electrolyte material, for example, >5V, then the electrolyte can be damaged.

Step 2: Charge battery with constant voltage $V_{hv}$. The charging process needs to be stopped momentarily, such as for example, from about 0.1 to about 1 second, and frequently, for example, once every 5 to 30 seconds, to measure the battery OCV.

Step 3: When the OCV is greater than or equal to the $V_{safe}$, stop charging for a period of tens of seconds. $V_{safe}$ is typically 4.1-4.4V, such as for example, 4.2V.

Step 4: Repeat step 2 & 3 for a number of times, such as for example 5 to 10 times.

Step 5: Charge with $V_{safe}$ until the charging current drops to a preset value, typically 0.1 C. In this process, step 5 provides the last 5% of the capacity; if this final capacity is not needed, then step 5 can be eliminated to minimize the charge time.

In yet another embodiment of a fast recharging process, a high voltage fast charge process is used with current cutoff as follows:

Step 1: Set a fast charge voltage $V_{hv}$. In one version, $V_{hv}$ is from about 4.4V to about 5V, such as for example, 4.6V. If the charging voltage is too low, then the charging time is long. If the voltage is too high, such as for example >5V, then the electrolyte can be damaged.

Step 2: Charge the battery with $V_{hv}$ until the charging current equal to or less than the cutoff current $I_c$, where $I_c=(V_{hv}-V_{safe})$/Battery internal resistance. $V_{safe}$ is typically from about 4.1V to about 4.4V, such as for example 4.2V.

Step 3: When the charging current is equal to or less than $I_c$, reduce the charging voltage by, typically, 0.1 V. Recalculate the cutoff current $I_c$. $I_c=$(New $V_{hv}-V_{safe}$)/Battery internal resistance. Charge with the reduced voltage until the new cutoff current is reached.

Step 4: Repeat step 2 & 3 until $V_{hv}=V_{safe}$.

Step 5: Charge the battery with $V_{safe}$ until the charging current drops to a preset current limit, typically 0.1 C-rate. Again step 5 provides the last 5% of the capacity; if this final capacity is not needed, then step 5 can be eliminated to minimize the charge time.

Figure 6:
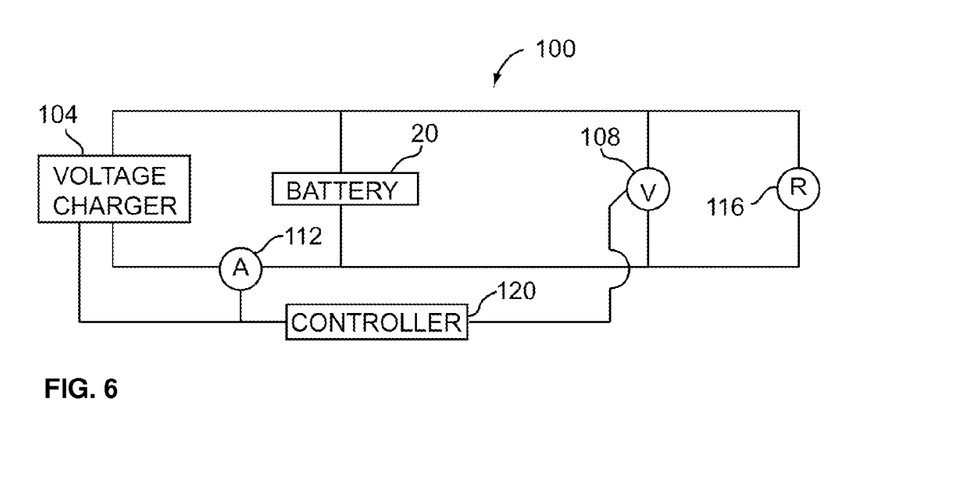
FIG. 6 is an exemplary embodiment of a battery recharging apparatus.

An exemplary embodiment of a battery recharging apparatus 100, as shown in FIG. 6, comprises a voltage charger 104 that provides a direct current (DC) voltage suitable for charging the battery 20. The voltage charger 104 may be, for example, an external AC source connected to a rectifier, a DC voltage source (such as a larger battery), or a photovoltaic cell. A voltmeter 108 can be used to measure the open circuit voltage of the battery 20. An ammeter 112 can be used to measure a current of the circuit. A resistance meter 116 can be used to measure the internal resistance of the battery 20, or the signals from the voltmeter 108 and ammeter 112 can also be used to calculate the internal resistance.

The battery recharging apparatus 100 can further comprise a controller 120 to regulate the voltage charger 104 in response to a voltage signal from the voltmeter 108, a current signal from the ammeter 112, or a resistance signal from the resistance meter 116. In one version, the controller 120 comprises computer-readable code and associated databases stored in the memory, e.g., on the non-removable storage media or on the removable storage media. The computer-readable code generally comprises code to operate the voltage charger 104 by increasing or reducing the charging voltage applied to the battery 20, or ending the charging process in response to a voltage signal from the voltmeter 108, a current signal from the ammeter 112, or a resistance signal from the resistance meter 116. The computer-readable code may be written in any conventional computer-readable programming language, such as, for example, assembly language, C++, or Fortran. Suitable program code is entered into a single file or multiple files using a conventional text editor and stored or embodied in a computer-usable medium of the memory. If the entered code text is in a high level language, the code is compiled, and the resultant compiler code is then linked with an object code of precompiled library routines. To execute the linked, compiled object code, the user invokes the object code, causing the CPU to read and execute the code to perform the tasks identified in the program. The program code or logic is implemented in hardware logic (e.g., an integrated circuit chip, Programmable Gate Array (PGA), Application Specific Integrated Circuit (ASIC), etc.) or a computer-readable medium, such as magnetic storage medium (e.g., hard disk drives, floppy disks, tape, etc.), optical storage (CD-ROMs, optical disks, etc.), or volatile and non-volatile memory devices (e.g., EEPROMs, ROMs, PROMs, RAMs, DRAMs, SRAMs, firmware, programmable logic, etc.). Code in the computer-readable medium is accessed and executed by the controller 120. The program code in which preferred embodiments are implemented may further be accessible through a transmission media or from a file server over a network.

The computer-readable code operating the controller 120 can include, for example, instructions or code to:
(1) determine a safe charging voltage ($V_{safe}$) of the battery which does not lower the concentration of positive ions in the cathode to a level ($C_{safe}$) that would excessively shorten the battery service life;
(2) operate the voltage charger to charge the battery with a voltage $V_{hv}$ which is higher than the $V_{safe}$;
(3) disconnect the voltage charger and use the voltmeter to measure the open circuit voltage of the battery; and (4) repeat (2) and (3) when the open circuit voltage is less than $V_{safe}$, and terminate the charging process when the open circuit voltage is substantially equal to $V_{safe}$;

In another example, the computer-readable code can include, for example, instructions or code to:

(1) determine a safe charging voltage ($V_{safe}$) of the battery which does not lower the concentration of positive ions in the cathode to a level ($C_{safe}$) that would excessively shorten the battery service life;

(2) operate the voltage charger to charge the battery with a voltage $V_{hv}$, which is higher than the $V_{safe}$;

(3) remove the charging voltage and measure the open circuit voltage of the battery; and (4) perform one of the following:
 (i) when the open circuit voltage is less than $V_{safe}$, repeat steps (2) through (4);
 (ii) when the open circuit voltage is substantially equal to $V_{safe}$, reducing the charging voltage by from about 0.1 to 0.3 volts, and then, repeating (2) through (4); or
 (iii) ending the charging process when the charging voltage equals $V_{safe}$.

In still another version, the computer-readable code can include, for example, instructions or code to:

(1) determine a safe charging voltage ($V_{safe}$) of the battery which does not lower the concentration of positive ions in the cathode to a level ($C_{safe}$) that would excessively shorten the battery service life;

(2) determine an internal resistance $R_{in}$ of the battery;

(3) operate the voltage charger to charge the battery with a voltage $V_{hv}$ which is higher than $V_{safe}$;

(4) monitor the charging current $I_{crg}$ of the battery; and (5) performing one of:
 (i) when $V_{hv} - I_{crg} \times R_{in} = V_{safe}$, reducing the charging voltage by about 0.1 to about 0.3 volts, and repeating (3) through (5); or
 (ii) when the charging voltage is equal to or less than $V_{safe}$, ending the charging process.

EXAMPLES

The following examples are provided to illustrate embodiments of the present recharging apparatus and process; however, the scope of the claims should not be limited to these illustrative embodiments. In these examples, two experiments were carried out to verify the effect of these quick charge processes: (1) A 4-step quick charge scheme with current constraint to cut the charge time nearly in half and (2) a greater than 4000 cycle of capacity test to demonstrate no degrading on battery performance.

4-Step Quick Charge Test

Figure 4:
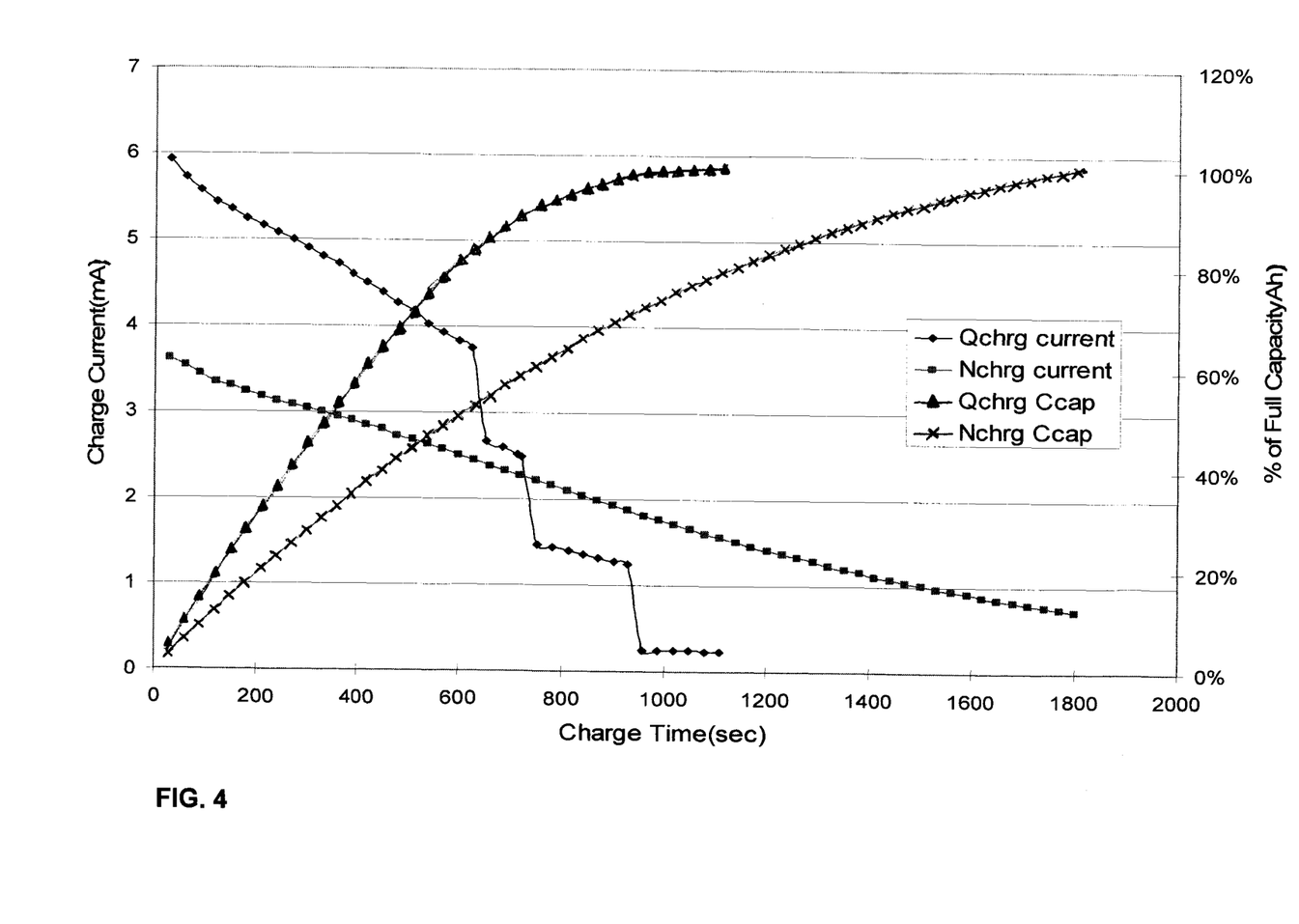
FIG. 4 is a graph of the charge current versus the charge time for a battery undergoing a quick recharge (Qchrg) and normal recharge (Nchrg) processes.

In order to demonstrate the effect of quick charge, a 4-step charging process with current cutoff is applied to the test sample with 1 mAh of capacity and 80 ohm of internal resistance. The charge voltage starts from 4.5V and ramps down 0.1V for each step to 4.4V, 4.3V and finally reaches the normal constant charge voltage of 4.2V. A table of the steps' voltages and their corresponding low current limits and the calculated effective charging voltage on the cathode is shown in Table I. The internal resistance of the battery in this experiment is 80 ohm. The results of quick charge are shown in FIG. 4. For comparison, the charging profiles of a regular 4.2V constant voltage recharge are also shown in the same figure.

TABLE I

| Voltage step # | Charge Voltage | Cutoff current (A) | Effective cathode charging voltage (V) @ low current limit |
|---|---|---|---|
| 1 | 4.5 | 0.00375 | 4.5 − 0.00375 * 80 = 4.2 |
| 2 | 4.4 | 0.00250 | 4.4 − 0.00250 * 80 = 4.2 |
| 3 | 4.3 | 0.00125 | 4.3 − 0.00125 * 80 = 4.2 |
| 4 | 4.2 | N.A. | N.A. |

The quick charge current (solid diamond line) has four steps due to the 4-step charge voltage, and its value is almost twice the charge current (solid rectangle line) of the normal constant voltage charge for the first 10 minutes of charge. Therefore, the quick charge is able to put in twice the capacity for charging the battery in a short time frame as shown by the quick charge capacity (solid triangle line) and normal charge capacity (x line) curves in FIG. 4. Based on this data, Table II was constructed to compare the quick charge time to the normal charge time for charging the battery to 25%, 50%, 75%, 90% and 95%, respectively, and the resulting improving factors for charge time. The charge time is cut down to nearly half by this 4-step quick charge process; thus, a doubling or improving factor of 2× is obtained through all of the charging process.

TABLE II

| Charge capacity % | Normal constant voltage charge time (minute) | 4-step quick charge time (minute) | Improving factor |
|---|---|---|---|
| 25% | 4.5 | 2.7 | 1.7 |
| 50% | 9.8 | 5.6 | 1.7 |
| 75% | 16.8 | 9.0 | 1.9 |
| 90% | 23.2 | 11.7 | 2.0 |
| 95% | 26.0 | 13.6 | 1.9 |

4300 Quick Charge Cycles Test

Figure 5:
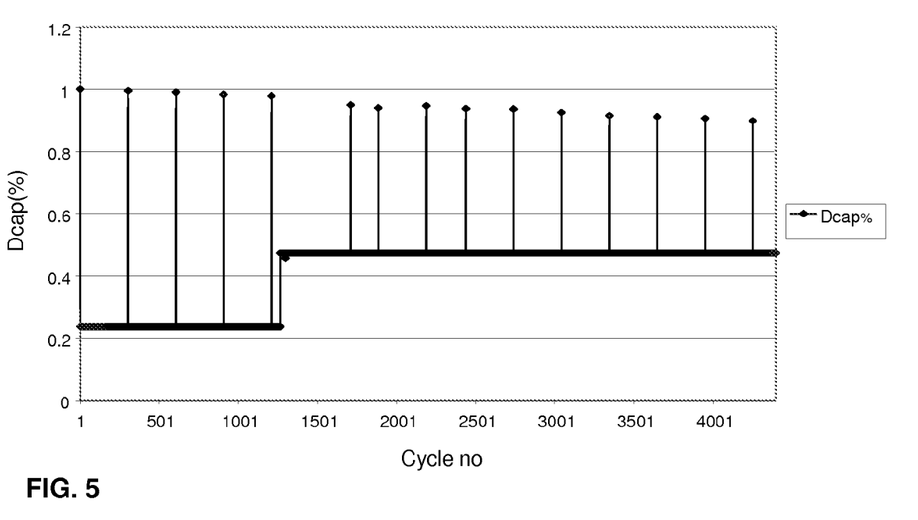
FIG. 5 is a graph of Dcap vs. cycle number over 2700 cycles for a battery which underwent a quick recharge process followed by discharge to determine if there would be overcharge damage to the battery.

A 4300-cycle of charge/discharge, equivalent to daily charge over a period of 11 years, was further performed to determine if there would be any overcharge damage to the battery 20 by applying the 4-step quick charge scheme, as shown in FIG. 5. The lines show the battery discharge capacity (Dcap) data. To minimize the time for the cycle test, a 25% discharge capacity limit was set for the first 1400 cycles, and this limit was raised to 50% for the remaining 1400 cycles. After each 300 cycles, the full battery capacity was measured at a discharge rate of 1/10 C. The battery charge capacity retention was determined to be 95% after 4300 cycles, indicating that a 4-step fast charge process did not damage the battery.

In the above examples, the $V_{safe}$ was set at 4.2V to ensure the material of the cathode 42 at the interface of the cathode 42 and electrolyte 44 was not damaged by overcharging. However, it should be noted that battery cells 22 having a cathode 42 of $LiCoO_2$ can be charged to 4.5V and still have a cycle life acceptable to many applications.

An alternative process to further increase the charge rate would be to set the $V_{safe}$ at a voltage higher than 4.2V (e.g., 4.4V). When the charging step stops because either the $V_{safe}$ is reached (for the constant voltage, voltage cutoff process) or the cutoff current is reached (for the constant voltage, current cutoff process), the cathode material at the interface with the electrolyte 44 is overcharged to the $V_{safe}$. The lithium from the rest of the cathode 42 will then diffuse into the overcharged layer of the cathode 42 and bring down the state of the charge to a safer status (equal of less than 4.2V). This process can increase the charge rate by additional 30 to 50%. However, the cycle life of the battery 20 can be shortened. This recharging process further reduces charging time at the expanse of the battery 20 lifecycle.

While illustrative embodiments of a recharging system, apparatus and method for a thin film or other battery are described in the present application, it should be understood that other recharging embodiments are also possible. The exemplary methods and recharging apparatus are provided only to illustrate the present invention, and other apparatus and methods may be used as would be apparent to those of ordinary skill in the art. Furthermore, the structure and configuration of the battery 20 and the materials of the battery component films 30 are also exemplary and may comprise other structures or materials. Thus, the scope of the claims should not be limited by the exemplary methods, materials and structures illustrated herein.

What is claimed is:

1. A method of charging a, the method comprising:
    (a) determining a safe charging voltage $V_{safe}$ that is the maximum open circuit voltage of the battery which provides a minimum battery capacity for a predetermined number of charge and discharge cycles of the battery;
    (b) charging the battery with a charging voltage $V_{hv}$ which is higher than the $V_{safe}$;
    (c) removing the charging voltage $V_{hv}$ and measuring the open circuit voltage of the battery; and
    (d) repeating steps (b) and (c) when the open circuit voltage is less than $V_{safe}$ or terminating charging when the open circuit voltage is substantially equal to or greater than $V_{safe}$.

2. A method according to claim 1 comprising providing a battery that includes a cathode comprising $LiCoO_2$, and determining a safe charging voltage $V_{safe}$ that is from about 4.1 to about 4.2 volts.

3. A method according to claim 1 comprising providing a battery that includes a cathode comprising $LiCoO_2$, and determining a safe charging voltage $V_{safe}$ that provides a minimum battery 5-hour rate discharge capacity of at least about 70% of the initial capacity after at least about 1000 charge and 80%-depth discharge cycles of the battery.

4. A method according to claim 1 comprising providing a battery that includes a cathode comprising $LiCoO_2$, and determining a safe charging voltage $V_{safe}$ that provides a minimum battery 5-hour rate discharge capacity of at least about 70% of the initial capacity after at least about 3000 charge and 80%-depth discharge cycles of the battery.

5. A method according to claim 1 wherein the battery comprises an anode current collector and a cathode current collector, and wherein (b) comprises connecting a positive polarity of a direct current (DC) power source to the cathode current collector of the battery and connecting a negative polarity of the DC power source to the anode current collector of a rechargeable battery.

6. A method according to claim 1 comprising charging the battery with a voltage $V_{hv}$ which is higher than the $V_{safe}$ by at least about 0.2 volts.

7. A method according to claim 1 comprising charging the battery with a voltage $V_{hv}$ which is higher than the $V_{safe}$ by at least about 0.4 volts.

8. A method according to claim 1 comprising charging the battery with a voltage $V_{hv}$ of from about 4.4 to about 5 volts.

9. A method according to claim 1 comprising charging the battery with a voltage $V_{hv}$ of about 4.8 volts.

10. A method according to claim 1 wherein (b) comprises charging the battery with a voltage $V_{hv}$ for from about 5 to about 50 seconds.

11. A method according to claim 1 wherein (c) comprises waiting for a time period that is at least about 10% of the time period used to charge the battery before measuring the open circuit voltage of the battery.

12. A method according to claim 1 wherein (c) comprises waiting for a time period of from about 1 to about 5 seconds after removing the voltage, before measuring the open circuit voltage of the battery.

13. A method of charging a rechargeable battery, the method comprising:
    (a) determining a safe charging voltage $V_{safe}$ that is the maximum open circuit voltage of the battery which provides a minimum battery capacity for a predetermined number of charge and discharge cycles of the battery;
    (b) charging the battery with a charging voltage $V_{hv}$ which is higher than the $V_{safe}$;
    (c) removing the charging voltage $V_{hv}$ and measuring the open circuit voltage of the battery; and
    (d) performing one of the following:
        (i) when the open circuit voltage is less than $V_{safe}$, repeating steps (b) through (d);
        (ii) when the open circuit voltage is substantially equal to $V_{safe}$, reducing the charging voltage by from about 0.1 to 0.3 volts, and then, repeating steps (b) through (d); or
        (iii) ending the charging process when the charging voltage V_hd hv is equal to or less than $V_{safe}$.

14. A method of charging a rechargeable battery, the method comprising:
    (a) determining a safe charging voltage $V_{safe}$ that is the maximum open circuit voltage of the battery which provides a minimum battery capacity for a predetermined number of charge and discharge cycles of the battery;
    (b) determining an internal resistance $R_{in}$ of the battery;
    (c) charging the battery with a charging voltage $V_{hv}$ which is higher than $V_{safe}$;
    (d) monitoring the charging current $I_{crg}$ of the battery; and
    (e) performing one of:
        (i) when $V_{hv} - I_{crg} \times R_{in} = V_{safe}$, reducing the charging voltage $V_{hv}$ by about 0.1 to about 0.3 volts, and repeating (c) through (e); or
        (ii) when the charging voltage $V_{hv}$ is equal to or less than $V_{safe}$, ending the charging process.

15. A battery charging apparatus for charging a battery, the apparatus comprising:
    (a) a voltage charger that provides a direct current voltage suitable for charging a battery;
    (b) a voltmeter to measure the open circuit voltage of the battery and generate a voltage signal;
    (c) an ammeter to measure a current of the battery charging circuit and generate a current signal; and
    (d) a controller to regulate the voltage charger in response to the voltage signal from the voltmeter, the current signal from the ammeter, and a determination of the internal resistance of the battery, the controller comprising computer-readable code to:
        (1) determine a safe charging voltage $V_{safe}$ that is the maximum open circuit voltage of the battery which provides a minimum battery capacity for a predetermined number of charge and discharge cycles of the battery;
        (2) operate the voltage charger to charge the battery with a voltage $V_{hv}$ which is higher than the $V_{safe}$;
        (3) disconnect the voltage charger and use the voltmeter to measure the open circuit voltage of the battery; and (4) repeat (2) and (3) when the open circuit voltage is less than $V_{safe}$, and terminate the charging process when the open circuit voltage is substantially equal to or greater than $V_{safe}$.

16. An apparatus according to claim 15 comprising a resistance meter to generate a battery resistance signal representative of the internal resistance of the battery, and wherein the controller receives the battery resistance signal.

17. An apparatus according to claim 15 wherein the controller determines the internal resistance of the battery from the voltage signal from the voltmeter and the current signal from the ammeter.

18. An apparatus according to claim 15 wherein the voltage charger comprises one of (i) an external AC source connected to a rectifier, (ii) a DC voltage source, or (iii) a photovoltaic cell.

19. A battery charging apparatus for charging a battery, the apparatus comprising:
(a) a voltage charger that provides a direct current voltage suitable for charging a battery;
(b) a voltmeter to measure the open circuit voltage of the battery and generate a voltage signal;
(c) an ammeter to measure a current of the battery and generate a current signal; and
(d) a controller to regulate the voltage charger in response to the voltage signal from the voltmeter, the current signal from the ammeter, and a determination of the internal resistance of the battery, the controller comprising computer-readable code to:
(1) determining a safe charging voltage $V_{safe}$ that is the maximum open circuit voltage of the battery which provides a minimum battery capacity for a predetermined number of charge and discharge cycles of the battery;
(2) operate the voltage charger to charge the battery with a charging voltage $V_{hv}$ which is higher than the $V_{safe}$;
(3) remove the charging voltage and measure the open circuit voltage of the battery; and
(4) perform one of the following:
(i) when the open circuit voltage is less than $V_{safe}$, repeat steps (2) through (4);
(ii) when the open circuit voltage is substantially equal to $V_{safe}$, reducing the charging voltage by from about 0.1 to 0.3 volts, and then, repeating (2) through (4); or
(iii) ending the charging process when the charging voltage $V_{hv}$ is equal to or less than $V_{safe}$.

20. A battery charging apparatus for charging a battery, the apparatus comprising
(a) a voltage charger that provides a direct current voltage suitable for charging a battery;
(b) a voltmeter to measure the open circuit voltage of the battery and generate a voltage signal;
(c) an ammeter to measure a current of the circuit and generate a current signal; and
(d) a controller to regulate the voltage charger in response to the voltage signal from the voltmeter, the current signal from the ammeter, and a determination of the internal resistance of the battery, the controller comprising computer-readable code to:
(1) determining a safe charging voltage $V_{safe}$ that is the maximum open circuit voltage of the battery which provides a minimum battery capacity for a predetermined number of charge and discharge cycles of the battery;
(2) determine an internal resistance $R_{in}$ of the battery;

(3) operate the voltage charger to charge the battery with a charging voltage $V_{hv}$ which is higher than $V_{safe}$;
(4) monitor the charging current $I_{crg}$ of the battery; and
(5) performing one of:
(i) when $V_{hv} - I_{crg} \cdot \times R_{in} = V_{safe}$, reducing the charging voltage by about 0.1 to about 0.3 volts, and repeating (3) through (5); or
(ii) when the charging voltage $V_{hv}$ is equal to or less than $V_{safe}$, ending the charging process.

21. A method according to claim 13 comprising providing a battery that includes a cathode comprising $LiCoO_2$, and determining a safe charging voltage $V_{safe}$ that is at least one of the following:
(i) from about 4.1 to about 4.2 volts; and
(ii) provides a battery 5-hour rate discharge capacity of at least about 70% of the initial capacity after at least about 1000 charge and 80%-depth discharge cycles of the battery.

22. A method according to claim 13 wherein (b) comprises charging the battery with a voltage $V_{hv}$ which is one of:
(i) higher than the $V_{safe}$ by at least about 0.2 volts;
(ii) higher than the $V_{safe}$ by at least about 0.4 volts; or
(iii) from about 4.4 to about 5 volts.

23. A method according to claim 13 wherein (b) comprises charging the battery with a voltage $V_{hv}$ for from about 5 to about 50 seconds.

24. A method according to claim 13 wherein (c) comprises waiting for a time period before measuring the open circuit voltage of the battery, the waiting time period being at least one of:
(i) about 10% of the time period used to charge the battery; and
(ii) from about 1 to about 5 seconds after removing the charging voltage from the battery.

25. A method according to claim 14 comprising providing a battery that includes a cathode comprising $LiCoO_2$, and determining a safe charging voltage $V_{safe}$ that is at least one of the following:
(i) from about 4.1 to about 4.2 volts; and
(ii) provides a battery 5-hour rate discharge capacity of at least about 70% of the initial capacity after at least about 1000 charge and 80%-depth discharge cycles of the battery.

26. A method according to claim 14 wherein (b) comprises charging the battery with a voltage $V_{hv}$ which is one of:
(i) higher than the $V_{safe}$ by at least about 0.2 volts;
(ii) higher than the $V_{safe}$ by at least about 0.4 volts; or
(iii) from about 4.4 to about 5 volts.

27. A method according to claim 14 wherein (b) comprises charging the battery with a voltage $V_{hv}$ for from about 5 to about 50 seconds.

28. A method according to claim 14 wherein (c) comprises waiting for a time period before measuring the open circuit voltage of the battery, the waiting time period being at least one of:
(i) about 10% of the time period used to charge the battery; or
(ii) from about 1 to about 5 seconds after removing the charging voltage from the battery.

29. An apparatus according to claim 19 comprising a resistance meter to generate a battery resistance signal representative of the internal resistance of the battery, and wherein the controller receives the battery resistance signal.

30. An apparatus according to claim 19 wherein the controller determines the internal resistance of the battery from the voltage signal from the voltmeter and the current signal from the ammeter.

31. An apparatus according to claim 19 wherein the voltage charger comprises one of (i) an external AC source connected to a rectifier, (ii) a DC voltage source, or (iii) a photovoltaic cell.

32. An apparatus according to claim 20 comprising a resistance meter to generate a battery resistance signal representative of the internal resistance of the battery, and wherein the controller receives the battery resistance signal.

33. An apparatus according to claim 20 wherein the controller determines the internal resistance of the battery from the voltage signal from the voltmeter and the current signal from the ammeter.

34. An apparatus according to claim 20 wherein the voltage charger comprises one of (i) an external AC source connected to a rectifier, (ii) a DC voltage source, or (iii) a photovoltaic cell.

35. A method of charging a rechargeable battery, the method comprising:
 (a) determining a safe charging voltage $V_{safe}$ that is the maximum open circuit voltage of the battery which provides a minimum battery capacity for a predetermined number of charge and discharge cycles of the battery;
 (b) determining an internal resistance $R_{in}$ of the battery;
 (c) charging the battery with a charging voltage $V_{hv}$ which is higher than $V_{safe}$ while monitoring the charging current $I_{ug}$ of the battery, until the charging current $I_{ug}$ is equal to or less than a cutoff current $I_c$, where $I_c = (V_{hv} - V_{safe})/R_{in}$;
 (d) reducing the charging voltage $V_{hv}$ to a reduced charging voltage when the charging current is equal to or less than $I_c$.

36. A method according to claim 35 further comprising:
 (e) recalculating the cutoff current $I_c$ from the reduced charging voltage to determine a new cutoff current;
 (f) continuing charging the battery with the reduced charging voltage until the new cutoff current is reached;
 (g) repeating steps (c) to (f) and ending the charging process when the charging voltage $V_{hv}$ is equal to or less than $V_{safe}$.

37. A method according to claim 35 wherein in (c), $V_{hv}$ is from about 4.4V to about 5V.

38. A method according to claim 35 wherein in (a), $V_{safe}$ is typically from about 4.1 V to about 4.4V.

39. A method according to claim 35 wherein in (c) the charging voltage $V_{hv}$ is higher than $V_{safe}$ but not high enough to cause a phase change in a cathode of the battery.

40. A method of charging a battery, the method comprising:
 (a) determining a safe charging voltage $V_{safe}$ that is the maximum open circuit voltage of the battery which provides a minimum battery capacity for a predetermined number of charge and discharge cycles of the battery;
 (b) charging the battery with a charging voltage $V_{hv}$ which is higher than the $V_{safe}$;
 (c) measuring an open circuit voltage of the battery after removing the charging voltage $V_{hv}$ and waiting for a time period; and
 (d) repeating steps (b) and (c) when the measured open circuit voltage is less than $V_{safe}$ or terminating charging when the open circuit voltage is substantially equal to or greater than $V_{safe}$.

41. A method according to claim 40 wherein (b) comprises charging the battery with a charging voltage $V_{hv}$ for a time period, and (c) comprises measuring an open circuit voltage of the battery after removing the charging voltage $V_{hv}$ and waiting for a time period that is at least about 10% of the time period for charging the battery.

42. A method according to claim 40 wherein (c) comprises waiting for a time period of from about 1 to about 5 seconds after removing the voltage $V_{hv}$, before measuring the open circuit voltage of the battery.

43. A method according to claim 40 comprising reducing the charging voltage $V_{hv}$ by from about 0.1 to about 0.3V, each time steps (b) to (d) are repeated.

44. A method of charging a battery, the method comprising:
 (a) determining a safe charging voltage $V_{safe}$ that is the maximum open circuit voltage of the battery which provides a minimum battery capacity for a predetermined number of charge and discharge cycles of the battery;
 (b) charging the battery with a charging voltage $V_{hv}$ which is higher than the $V_{safe}$;
 (c) measuring the open circuit voltage of the battery after removing the charging voltage $V_{hv}$ and waiting for a time period;
 (d) repeating steps (b) and (c) and stopping charging when the measured open circuit voltage is greater than or equal to $V_{safe}$ for another time period; and
 (e) charging the battery with a voltage that is $V_{safe}$ until the battery current drops to a preset value.

45. A method according to claim 44 wherein the preset value is battery current is 0.1C-rate.

46. A method according to claim 1 wherein the battery comprises a cathode, and wherein (b) comprises charging the battery with a charging voltage $V_{hv}$ which is selected in relation to the thickness of the thickness of the cathode.

47. A method of charging a battery, the method comprising:
 (a) determining a safe charging voltage $V_{safe}$ for the battery that is capable of providing at least a predetermined battery capacity after a predetermined number of charge and discharge cycles of the battery; and
 (b) charging the battery with a charging voltage $V_{hv}$;
 (c) removing the charging voltage $V_{hv}$, and after a time period, measuring the open circuit voltage of the battery; and
 (d) terminating charging of the battery when the measured open circuit voltage is substantially equal to or greater than $V_{safe}$.

48. A method according to claim 47 wherein (c) comprises waiting for a time period that is at least about 10% of the time period used to charge the battery.

* * * * *

UNITED STATES PATENT AND TRADEMARK OFFICE
CERTIFICATE OF CORRECTION

| | | |
|---|---|---|
| PATENT NO. | : 8,502,494 B2 | Page 1 of 1 |
| APPLICATION NO. | : 12/870755 | |
| DATED | : August 6, 2013 | |
| INVENTOR(S) | : Nieh et al. | |

It is certified that error appears in the above-identified patent and that said Letters Patent is hereby corrected as shown below:

In the Claims:

Column 13, line 18, "A method of charging a," should be changed to --A method of charging a battery,--.

Signed and Sealed this
Twenty-fourth Day of September, 2013

Teresa Stanek Rea
*Deputy Director of the United States Patent and Trademark Office*